(12) United States Patent
Ito et al.

(10) Patent No.: US 12,157,282 B2
(45) Date of Patent: Dec. 3, 2024

(54) METHOD OF MANUFACTURING OPTICAL MEMBER, AND OPTICAL MEMBER

(71) Applicant: MITSUI CHEMICALS, INC., Tokyo (JP)

(72) Inventors: Shinsuke Ito, Omuta (JP); Nigel Ribeiro, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 278 days.

(21) Appl. No.: 17/637,529

(22) PCT Filed: Sep. 16, 2020

(86) PCT No.: PCT/JP2020/035071
§ 371 (c)(1),
(2) Date: Feb. 23, 2022

(87) PCT Pub. No.: WO2021/054358
PCT Pub. Date: Mar. 25, 2021

(65) Prior Publication Data
US 2022/0288817 A1    Sep. 15, 2022

(30) Foreign Application Priority Data

Sep. 20, 2019   (JP) ................. 2019-172153

(51) Int. Cl.
*B29D 11/00*    (2006.01)
*B29C 33/40*    (2006.01)
*B29C 39/26*    (2006.01)
*G02B 1/04*     (2006.01)

(52) U.S. Cl.
CPC ........ *B29D 11/00413* (2013.01); *B29C 33/40* (2013.01); *B29C 39/26* (2013.01); *G02B 1/04* (2013.01)

(58) Field of Classification Search
CPC ... B29C 39/26; B29C 33/40; B29D 11/00413; G02B 1/04
See application file for complete search history.

(56) References Cited

U.S. PATENT DOCUMENTS

2008/0143004 A1   6/2008  De Wilt et al.
2017/0260132 A1   9/2017  Kunimoto et al.
2022/0120935 A1*  4/2022  Ahiko ............... B24B 37/08

FOREIGN PATENT DOCUMENTS

EP    0226123 A2      6/1987
EP    2799455 B1  *   3/2018  ........... C08F 12/30
JP    S5175762 A      6/1976
JP    62-212108   *   9/1987
(Continued)

*Primary Examiner* — Mathieu D Vargot
(74) *Attorney, Agent, or Firm* — BUCHANAN, INGERSOLL & ROONEY PC (57) ABSTRACT

A method of manufacturing an optical member by curing a thermally polymerizable composition by heating includes, in the following order: a first step of filling an inside of a mold with the thermally polymerizable composition in which the mold is configured by disposing a frame-shaped member, with a Young's modulus of 1.0 GPa or more at a polymerization initiation temperature of the thermally polymerizable composition, between two mold members facing each other; and a second step of heating the mold to the polymerization initiation temperature or more.

16 Claims, 8 Drawing Sheets

(56) References Cited

FOREIGN PATENT DOCUMENTS

| | | | |
|---|---|---|---|
| JP | S62212108 A | 9/1987 | |
| JP | 2000315315 A | 11/2000 | |
| JP | 2001167473 A | 6/2001 | |
| JP | 2006235007 A | 9/2006 | |
| JP | 2006-343548 * | 12/2006 | |
| JP | 2012000915 A | 1/2012 | |
| JP | 2012017363 A | 1/2012 | |
| JP | 2012232433 A | 11/2012 | |
| JP | 2017533180 A | 11/2017 | |
| WO | WO-2004086492 A1 * | 10/2004 | ............. B29C 43/18 |
| WO | 2006055677 A1 | 5/2006 | |
| WO | 2010073625 A1 | 7/2010 | |

\* cited by examiner

METHOD OF MANUFACTURING OPTICAL MEMBER, AND OPTICAL MEMBER

TECHNICAL FIELD

The present disclosure relates to a method of manufacturing an optical member, and an optical member.

BACKGROUND ART

As a method of manufacturing a plastic lens, a casting polymerization method has been known. In this method, a pair of glass molds are disposed at predetermined intervals, and an adhesive tape is attached to the outer peripheral surfaces of these glass molds along the circumferential direction to seal the space between the pair of glass molds. Next, the injection nozzle is inserted into the sealed space, and the polymerizable monomer is injected and filled into the space via the injection nozzle. Then, the polymerizable monomer polymerizes and is cured by heating or the like to obtain a plastic lens molded product. Various techniques have been proposed as an adhesive tape used in manufacturing this plastic lens molded product (see, for example, Patent Literature 1 and 2).

PRIOR ART DOCUMENT

Patent Literature

[Patent Literature 1] Japanese Patent Application Laid-Open (JP-A) No. 2012-915
[Patent Literature 2] JP-A No. 2012-17363

SUMMARY OF INVENTION

Technical Problem

In the method of molding the plastic lens described in Patent Literature 1 and Patent Literature 2, as the polymerization shrinks, the adhesive tape deforms and follows the shrinkage. However, in the method of molding the plastic lens used in these adhesive tape, the deformation of the adhesive tape cannot be adjusted, and thereby it was difficult to adjust, an absolute value (hereinafter, also referred to as "parallelism of main surfaces") of the difference in flatness between two main surfaces of the plastic lens to be manufactured, to be small.

Further, in the case of manufacturing a blank for the plastic lens as in the techniques described in Patent Literature 1 and Patent Literature 2, after the blank is manufactured, the blank is polished to be processed into a prescription lens (processing for prescription lens corresponding to lowering parallelism between the main surfaces), and therefore, there was no technical challenge to increase parallelism of the blank main surfaces. However, the inventors of the present disclosure paid attention to the fact that the accuracy of optical information transmission is improved by using an optical member having high parallelism of the main surfaces for the apparatus for transmitting optical information described later, and they have found a challenge of manufacturing an optical member excellent in parallelism of main surfaces.

An object of the present disclosure is to provide an optical member capable of manufacturing an optical member excellent in parallelism of main surfaces, and an optical member excellent in parallelism of the main surfaces.

Solution to Problem

The present disclosure relates to the following aspects.
<1> A method of manufacturing an optical member by curing a thermally polymerizable composition by heating, comprising, in the following order: a first step of filling an inside of a mold with the thermally polymerizable composition in which the mold is configured by disposing a frame-shaped member, with a Young's modulus of 1.0 GPa or more at a polymerization initiation temperature T (° C.) of the thermally polymerizable composition, between two mold members facing each other; and a second step of heating the mold to the polymerization initiation temperature T or more.
<2> The method of manufacturing an optical member according to <1>, wherein: the frame-shaped member is provided with at least one aperture, and in the first step, the thermally polymerizable composition is filled inside the mold from the aperture.
<3> The method of manufacturing an optical member according to <2>, wherein: the frame-shaped member is provided with a plurality of apertures, and a frame portion of the frame-shaped member is positioned on virtual straight lines extending from an outside of the apertures to an inside of the frame-shaped member via the apertures.
<4> The method of manufacturing an optical member according to <2> or <3>, wherein in the first step, when the mold is disposed such that main surfaces of the mold member is substantially orthogonal to a vertical direction, the mold is provided with an aperture member connecting with the aperture at an outer peripheral side of the frame-shaped member and sloping toward a vertical upper side, and the thermally polymerizable composition is filled inside the mold via the aperture member.
<5> The method of manufacturing an optical member according to any one of <1> to <4>, wherein the mold is a mold layered body configured by stacking the mold members and frame-shaped members repeatedly.
<6> The method of manufacturing an optical member according to <5>, wherein, in the second step, the mold layered body is disposed such that main surfaces of the mold members are substantially orthogonal to a vertical direction and the mold layered body is heated.
<7> The method of manufacturing an optical member according to any one of <1> to <6>, wherein an average distance between main surfaces of the two mold members facing each other in the mold is 10 mm or less.
<8> The method of manufacturing an optical member according to any one of <1> to <7>, wherein a refractive index of the optical member is 1.58 or more.
<9> The method of manufacturing an optical member according to any one of <1> to <8>, wherein the thermally polymerizable composition contains at least one selected from the group consisting of a poly(thi)ol compound, a polyiso(thio)cyanate compound and an episulfide compound.
<10> An optical member formed by curing a thermally polymerizable composition by heating, comprising: a surface A having an area of 1 mm$^2$ or more, and a surface B located on an opposite side from the surface A, and having an area of 1 mm$^2$ or more, wherein, in the surface A and the surface B, when a flatness of a region having an area of 1 mm$^2$ is measured by a non-contact type optical flatness meter, a flatness of the surface A and a flatness of the surface B is 50 µm or less, and the optical member contains a mold release agent.
<11> An optical member formed by curing a thermally polymerizable composition by heating, comprising: a surface A having an area of 1 mm$^2$ or more, and a surface B located on an opposite side from the surface A, and having an area of 1 mm² or more, wherein, in the surface A and the surface B, when a flatness of a region having an area of 1 mm² is measured by a non-contact type optical flatness meter, an absolute value of a difference between a flatness of the surface A and a flatness of the surface B is 10 µm or less, and the optical member contains a mold release agent.

<12> The optical member according to <10> or <11>, wherein the surface A and the surface B do not have a grinding mark.

<13> The optical member according to any one of <10> to <12>, wherein a cured product formed by curing the thermally polymerizable composition by heating contains at least one selected from the group consisting of a poly(thio) urethane resin and an episulfide resin.

Advantageous Effects of Invention

The present disclosure enables to provide a method of manufacturing an optical member capable of manufacturing an optical member excellent in parallelism of main surfaces and an optical member excellent in parallelism of main surfaces.

DESCRIPTION OF EMBODIMENTS

Examples of preferred embodiments of the present disclosure will now be described in detail. The following descriptions and Examples are for illustrating the embodiments, and are not intended to limit the scope of the embodiments.

In the present disclosure, any numerical range described using the expression "from * to" represents a range in which numerical values described before and after the "to" are included in the range as a lower limit value and an upper limit value, respectively.

In the present disclosure, the definition of the term "step" includes not only an independent step, but also a step which is not clearly distinguishable from another step, as long as the purpose of the step is achieved.

In the present disclosure, the term "optical member" refers to a member composed of at least one layer including a cured product of a thermally polymerizable composition. An optical member of the present disclosure may be in the form of a laminated body in which a plurality of members including the cured product of the thermally polymerizable composition are disposed one on another in layers.

<Method of Manufacturing Optical Member>

A method of manufacturing an optical member of the present disclosure is a method of manufacturing the optical member by curing a thermally polymerizable composition by heating, includes, in the following order: a first step of filling an inside of a mold with the thermally polymerizable composition in which the mold is configured by disposing a frame-shaped member, with a Young's modulus of 1.0 GPa or more at a polymerization initiation temperature T (° C.) of the thermally polymerizable composition, between two mold members facing each other; and a second step of heating the mold to the polymerization initiation temperature T or more.

In the method of manufacturing the optical member of the present disclosure, the frame-shaped member, with a Young's modulus of 1.0 GPa or more at the polymerization initiation temperature T (° C.) of the thermally polymerizable composition is used, and the inside of the mold configured by disposing the frame-shaped member between two mold members facing each other is filled with the thermally polymerizable composition. Then, the thermally polymerizable composition is cured by heating the mold filled with the thermally polymerizable composition to obtain the optical member. In this manufacturing method, because the frame-shaped member with a relatively high Young's modulus is used at the polymerization initiation temperature of the thermally polymerizable composition, deformation of the frame-shaped member is inhibited when the thermally polymerizable composition is cured. Thereby, the optical member excellent in parallelism of main surfaces can be obtained. The optical member excellent in parallelism of main surfaces can transmit optical information with higher accuracy, for example.

In the method of manufacturing the optical member of the present disclosure, the thermally polymerizable composition is cured by heating to manufacture the optical member. The thermally polymerizable composition may contain a thermally polymerizable compound that polymerizes by heating.

The thermally polymerizable compound is not particularly limited as long as it is a compound that polymerizes by heating, and the thermally polymerizable compound is preferably at least one selected from a (meta)allyl carbonate compound, an episulfide compound, a polyiso(thio)cyanate compound, a poly(thi)ol compound, a (thio)epoxy compound, an oxetanyl compound, a thietanyl compound, a (meth)acrylic compound, a (meth)acryloyl compound, an alkene compound, an alkyne compound, a bifunctional or higher active hydrogen compound, and an acid anhydride. Among them, from the point of a refractive index of the obtained optical member, the thermally polymerizable compound is preferably at least one of the polyiso(thio)cyanate compound, the poly(thi)ol compound, or the episulfide compound, more preferably the polyiso(thio)cyanate compound, and the poly(thi)ol compound, or the episulfide compound, and still more preferably the polyisocyanate compound, and the polythiol compound, or the episulfide compound.

In the present disclosure, a polyiso(thio)cyanate compound means at least one of a polyisocyanate compound or a polythiocyanate compound, a poly(thi)ol compound means at least one of a polyol compound or a polythiol compound, a (meth)acryloyl compound means at least one of a acryloyl compound or methacryloyl compound, and the same is true for other compounds.

The polyiso(thio)cyanate compound is preferably a diiso(thio)cyanate compound, and more preferably diisocyanate compound. Examples of the diisocyanate compound include 2,4-tolylene diisocyanate, 2,6-tolylene diisocyanate, diphenylmethane diisocyanate, m-xylylene diisocyanate, m-phenylene diisocyanate, isophorone diisocyanate, hexamethylene diisocyanate, 2,5-bis(isocyanatomethyl)bicyclo-[2.2.1]-heptane, 2,6-bis(isocyanatomethyl)bicyclo-[2.2.1]-heptane, 1,3-bis(isocyanatomethyl)cyclohexane, 1,4-bis(isocyanatomethyl)cyclohexane, bis(4-isocyanatocyclohexyl)methane and 1,5-pentamethylene diisocyanate. The diisocyanate compound may be used alone or in combination of two or more.

The poly(thi)ol compound is preferably the polythiol compound. Examples of the polythiol compound include pentaerythritol tetrakis(3-mercaptopropionate), pentaerythritol tetrakis(2-mercaptoacetate), 4-mercaptomethyl-1,8-dimercapto-3,6-dithiaoctane, 5,7-dimercaptomethyl-1,11-dimercapto-3,6,9-trithiandecan, 4,7-dimercaptomethyl-1,11-dimercapto-3,6,9-trithianeundecane, 4,8-dimercaptomethyl-1,11-dimercapto-3,6,9-trithiandecan, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietan, 1,2-bis(mercaptomethyl)benzene, 1,3-bis(mercaptomethyl)benzene and 1,4-bis(mercaptomethyl)benzene. The polythiol compound may be used alone or in combination of two or more.

The episulfide compound may be a compound having an episulfide group, example thereof include episulfide compounds described in WO 2017/159839, or JP-A 2018-154690, thioepoxy compounds described in JP-A 2002-194083, and new tetrathiaspiro compounds described in JP-A 2019-1785.

A content ratio of the thermally polymerizable compound is preferably 80% by mass or more, more preferably 90% by mass or more, with respect to a total amount of the thermally polymerizable composition. The content ratio of the thermally polymerizable compound may be 99% by mass or less, or may be 95% by mass or less, with respect to the total amount of the thermally polymerizable composition.

The thermally polymerizable composition may contain another component other than the thermally polymerizable compound. Examples of another component include polymerization catalysts, thermal polymerization initiators, internal mold release agents, resin modifiers, chain extenders, cross-linking agents, radical trapping agents, light stabilizers, ultraviolet ray absorbers, antioxidants, oil-soluble dyes, fillers, adhesion improvers, antibacterial agents, antistatic agents, dyes, fluorescent whitening agents, fluorescent pigments, and blue ink agents such as inorganic pigments.

The thermally polymerizable composition may contain the internal mold release agent from the point of improving releasability between the optical member obtained by the curing of the thermally polymerizable composition, and the frame-shaped member and the mold member. Examples of the internal mold release agent are not particularly limited and examples thereof include acidic phosphoric esters. Examples of the acidic phosphoric ester include phosphoric monoesters and phosphoric diesters.

The internal mold release agent may be used alone or in combination of two or more.

Examples of a commercial product of the phosphoric ester include ZelecUN (manufactured by Stepan Company), the internal mold release agent for MR (manufactured by Mitsui Chemicals, Inc.), the JP series manufactured by Johoku Chemical Industry Co., Ltd., the Phosphanol (registered trademark) series manufactured by Toho Chemical Industry Co., Ltd., and the AP series and the DP series manufactured by DAIHACHI CHEMICAL INDUSTRY CO., LTD., Among them, ZelecUN (manufactured by Stepan Company), and the internal mold release agent for MR (manufactured by Mitsui Chemicals, Inc.) are preferable.

Examples of the polymerization catalyst include tertiary amine compounds, inorganic acid salts or organic acid salts thereof, imidazole compounds, quaternary phosphonium salts, metal compounds, metal salts, quaternary ammonium salts, and organic sulfonic acids. In a case in which the polymerization catalyst is contained in the thermally polymerizable composition, a content ratio of the polymerization catalyst is preferably from 5 ppm to 15% by mass, more preferably from 10 ppm to 10% by mass, still more preferably from 50 ppm to 3% by mass, with respect to the total amount of the thermally polymerizable composition.

Examples of the thermal polymerization initiator include ketone peroxide compounds, diacyl peroxide compounds, dialkyl peroxide compounds, peroxyketal compounds, alkyl perester compounds, and peroxycarbonate compounds. In a case in which the thermal polymerization initiator is contained in the thermally polymerizable composition, a content ratio of the thermal polymerization initiator is preferably from 0.1% by mass to 20% by mass, more preferably from 0.5% by mass to 10% by mass, still more preferably from 1% by mass to 5% by mass, with respect to the total amount of the thermally polymerizable composition.

In a case in which the thermally polymerizable composition obtained by mixing the thermally polymerizable compound and another component such as the polymerization catalyst and thermal polymerization initiator, the thermally polymerizable composition may be used after degassing under reduced pressure of 0.1 Torr to 100 Torr for 0.1 to 5 hours and filtering through a 0.1 µm to 10 µm filter.

(First Step)

The method of manufacturing the optical member of the present disclosure includes the first step filling the inside of the mold with the thermally polymerizable composition in which the mold is configured by disposing the frame-shaped member, with the Young's modulus of 1.0 GPa or more at the polymerization initiation temperature T (° C.) of the thermally polymerizable composition, between two mold members facing each other.

The frame-shaped member used in the method of manufacturing the optical member of the present disclosure has the Young's modulus of 1.0 GPa or more at the polymerization initiation temperature T (° C.) of the thermally polymerizable composition. The Young's modulus at the polymerization initiation temperature T (° C.) of the thermally polymerizable composition may be 3.0 GPa or more, or may be 300 GPa or less, from the point of strength and ease of manufacturing the frame-shaped member. The Young's modulus at the polymerization initiation temperature T (° C.) of the thermally polymerizable composition is preferably 200 GPa or less, more preferably from 10 GPa to 200 GPa, still more preferably from 50 GPa to 200 GPa, from the point of maintaining parallelism and inhibiting mold damage.

The polymerization initiation temperature T (° C.) of the thermally polymerizable composition varies depend on the kind of the thermally polymerizable compound contained in the thermally polymerizable composition, for example, is preferably from 10° C. to 150° C., and, in a case in which the polyisocyanate compound and the polythiol compound or the episulfide compound is used as the thermally polymerizable compound, is preferably from 10° C. to 40° C.

The material of the frame-shaped member is not particularly limited as long as the Young's modulus at the polymerization initiation temperature T (° C.) of the thermally polymerizable composition is 1.0 GPa or more, and examples thereof include polymer compounds, inorganic compounds, metals, and metal alloys, among them, the metals and the metal alloys are preferable from the point of easy processing and the excellent Young's modulus.

Examples of the specific material of the frame-shaped member include polymer compounds such as polyolefin, polystyrene, polycarbonate and nylon, inorganic compounds such as silicate glass and aluminum oxide, metals such as aluminum, copper, titanium, zinc, tungsten and molybdenum, and metal alloys such as magnesium alloys, aluminum alloys, brass and stainless steel. Among them, aluminum and stainless steel are preferable.

The mold members used in the method of manufacturing the optical member of the present disclosure are members for forming the mold configured by sandwiching the frame-shaped member with two mold members whose main surfaces face each other, and thereby disposing the frame-shaped member between the two mold members facing each other. The thermally polymerizable composition is cured by heating, at the polymerization initiation temperature T (° C.) or more, the mold with the inside of the mold filled with the thermally polymerizable composition, to obtain the optical member.

The method of filling the inside of the mold with the thermally polymerizable composition is not particularly limited. For example, the frame-shaped member may be disposed on the main surface of one mold member disposed on the horizontal plane. Then, after supplying the thermally polymerizable composition to the frame-shaped member from the vertical upper side to fill the inside of the frame-shaped member with thermally polymerizable composition, the main surface of the other mold member may be disposed on the frame-shaped member. Alternatively, it is allowed that the frame-shaped member that is provided with at least one aperture is prepared, and the inside of the mold that is configured by disposing the frame-shaped member between two mold members facing each other is filled with the thermally polymerizable composition from the aperture. By using the frame-shaped member that is provided with the aperture, when the thermally polymerizable composition filled inside the frame-shaped member is polymerized, early peeling from the main surface of the mold member due to polymerization shrinkage can be inhibited. For example, in a case in which the mold filled with the thermally polymerizable composition inside the frame-shaped member is disposed such that the main surfaces is substantially orthogonal to a vertical direction, even if the polymerization shrinkage occurs, the liquid level of the thermally polymerizable composition becomes only lowered, and the peeling from the main surface of the mold member can be inhibited.

The frame-shaped member may be provided with a plurality of the apertures. Because the frame-shaped member is provided with a plurality of the apertures, the inside of the mold can be filled with the thermally polymerizable composition from one aperture, and the gas inside the mold can be released from another aperture.

In a case in which the frame-shaped member is provided with a plurality of the apertures, each frame portion of the frame-shaped member is preferably positioned on virtual straight lines extending from the outside of the apertures to the inside of each frame-shaped member via the apertures. Thereby, when the inside of the mold is filled with the thermally polymerizable composition from one aperture, it is possible to inhibit the leak of the thermally polymerizable composition from another aperture.

In a case in which the frame-shaped member is provided with a plurality of the apertures, the angle θ between the virtual straight line extending from the outside of the aperture for filling the inside of the mold with the thermally polymerizable composition, to the inside of the frame-shaped member via the aperture, and the virtual straight line extending from the outside of another aperture to the inside of the frame-shaped member via the another aperture is preferably less than 180°. The angle θ is preferably from 75° to 90° from the point of inhibiting the leak of the thermally polymerizable composition outside the mold.

In the apertures, the aperture area at the outer peripheral portion of the frame-shaped member and the aperture area at the inner peripheral portion of the frame-shaped member may be the same or may be different from each other. For example, the aperture may have a tapered shape in which the area of the aperture decreases from the outer circumference to the inner circumference.

The area of the aperture is preferably from 10 mm$^2$ to 200 mm$^2$, more preferably from 10 mm$^2$ to 50 mm$^2$, from the point of suitably filling the inside of the mold with the thermally polymerizable composition and suitably release the gas inside the mold from the aperture.

The area of the aperture is a value obtained by dividing a total of the aperture area at the outer peripheral portion of the frame-shaped member and the aperture area at the inner peripheral portion of the frame-shaped member by 2.

The thickness of the frame-shaped member is the same as the preferable range of an average distance between main surfaces of the two mold members facing each other in the mold described below.

The area of the inside of the frame-shaped member (the area of the inside of the frame-shaped member facing main surfaces of the mold members) may be from 10 mm$^2$ to 20000 mm$^2$, or may be from 100 mm$^2$ to 1000 mm$^2$.

The width of the frame portion of the frame-shaped member may be from 1 mm to 10 mm, or may be from 3 mm to 8 mm, from the point of the strength and the cost.

The shape of the frame-shaped member is determined by the shape of the optical member to be manufactured, and may be, for example, a square frame shape, a circular frame shape, an elliptical frame shape, or the like.

The material of the mold members used in the method of manufacturing the optical member of the present disclosure include glass, metals and the like. A mold release agent may be added on the contact surface with the thermally polymerizable composition of the mold member in advance, from the point of improving releasability of the obtained optical member. A coating liquid may be added on the contact surface with the thermally polymerizable composition of the mold member, from the point of adding hard coat performance.

The mold release agent that can be added on the contact surface with the thermally polymerizable composition of the mold member, in other words, an external mold release agent is not particularly limited, and for example, is preferably a fluoroacrylic compound and the like.

The shape of the main surface of the mold member is determined by the shape of the optical member to be manufactured, and may be, for example, a rectangular shape, a circular shape, an elliptical shape, or the like.

The average distance between main surfaces of the two mold members facing each other in the mold is preferably 10 mm or less from the point of obtaining the optical member with excellent parallelism. The above-mentioned average distance between main surfaces may be from 0.3 mm to 5 mm, or may be from 0.5 mm to 3 mm.

The above-mentioned average distance between main surfaces is a value obtained by dividing a total of the maximum distance and the minimum distance between the main surfaces by 2.

The above-mentioned average distance between main surfaces is a value corresponding to the thickness of the frame-shaped member and the thickness of the optical member.

Regarding the main surfaces of the two mold members facing each other, when regions having an area of 100 mm² whose centers are the centers of gravity of the main surfaces are measured by a non-contact type optical surface roughness tester, it is preferable that the values thereof are each independently 5 μm or less from the point of obtaining the optical member with excellent parallelism.

The arithmetic average roughness Ra in the present disclosure is based on the value defined in JIS B0601 (2013).

The relationship between the main surfaces of the two mold members facing each other is not particularly limited as long as the main surfaces are substantially parallel to each other, and the main surfaces may have a planar shape substantially orthogonal to a vertical direction or may have a curved surface shape.

The mold may be a mold layered body configured by stacking the mold members and the frame-shaped members repeatedly. For example, by stacking the mold member, the frame-shaped member, the mold member, the frame-shaped member and the mold member in this order, the mold layered body having two regions to be filled with the thermally polymerizable composition is obtained.

In a case in which the mold layered body is configured by stacking the mold members and the frame-shaped members repeatedly, it is preferable that each frame-shaped member configuring the mold layered body is provided with at least one aperture. Thereby, it is possible to fill the inside of each frame-shaped member with the thermally polymerizable composition from the aperture, and further it is possible to manufacture a plurality of the optical member by using the mold layered body. This configuration is excellent in manufacturing efficiency of the optical member.

In the mold and the mold layered body, a tape-shaped member may be wrapped around the outer peripheral portions of the frame-shaped member(s) and the mold members from the point of inhibiting a leak of the thermally polymerizable composition inside the mold. The tape-shaped member is not particularly limited as long as the tape-shaped member can fix the frame-shaped member and the mold members, and can inhibit the leak of the thermally polymerizable composition inside the mold, and a conventionally known adhesive tape or the like may be used.

In the first step, when the mold is disposed such that main surfaces of the mold member is substantially orthogonal to a vertical direction, the mold is provided with an aperture member connecting with the aperture at an outer peripheral side of the frame-shaped member and sloping toward a vertical upper side. The thermally polymerizable composition is filled inside the mold via the aperture member, and thereby the thermally polymerizable composition can be suitably filled inside the mold.

In the present disclosure, "substantially orthogonal" means that the angle intersecting a vertical direction is from 85° to 95°.

(Second Step)

The method of manufacturing the optical member of the present disclosure includes the second step of heating the mold to the polymerization initiation temperature T or more. The temperature for heating the mold in the second step is preferably from 80° C. to 150° C., or in a case in which the polyisocyanate compound and the polythiol compound or the episulfide compound is used as the thermally polymerizable compound, is preferably from 100° C. to 130° C.

The time for heating the mold in the second step is, for example, preferably from 1 hour to 50 hours.

In a case in which the mold layered body is configured by stacking the mold members and the frame-shaped members repeatedly, in the second step, it is preferable that the mold layered body is disposed such that main surfaces of the mold members are substantially orthogonal to a vertical direction and the mold layered body is heated, from the point of heating the thermally polymerizable composition inside the mold with high uniformity.

After the second step, the optical member can be obtained by removing the mold members and the frame-shaped member. If necessary, the obtained optical member may be heated and subjected to annealing treatment for the purpose of reducing a warp. The annealing temperature is preferably from 80° C. to 150° C., more preferably from 90° C. to 130° C. The annealing time is preferably from 0.5 hours to 10 hours, more preferably from 1 hour to 6 hours.

Hereinafter, a first embodiment to a third embodiment of the method of manufacturing the optical member of the present disclosure will be described. The method of manufacturing the optical member is not limited to the configurations of the following embodiments.

First Embodiment

Figure 1:
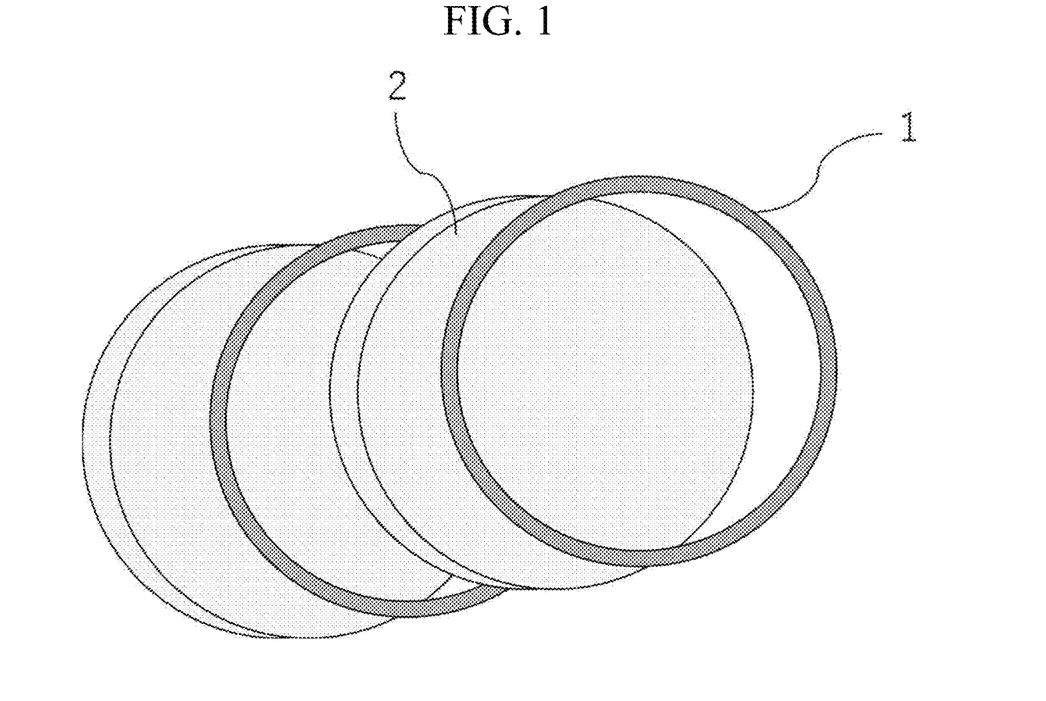
FIG. 1 is a schematic configuration view showing a specific example of frame-shaped members and mold members used in a first embodiment of the present disclosure.

The specific example of the frame-shaped members and the mold members used in the first embodiment of the present disclosure is shown in FIG. 1. As shown in FIG. 1, in the first embodiment, the frame-shaped members 1 with a circular frame shape that are not provided with the aperture, and the mold members 2 whose main surfaces are a circular shape are used. In the present embodiment, the above-mentioned first step may be performed as follows. The frame-shaped member 1 is disposed on the main surface of one mold member 2 disposed on the horizontal plane. After supplying the thermally polymerizable composition to the frame-shaped member 1 from the vertical upper side to fill the inside of the frame-shaped member 1 with thermally polymerizable composition, the main surface of the other mold member 2 is disposed on the frame-shaped member 1.

Second Embodiment

Figure 2:
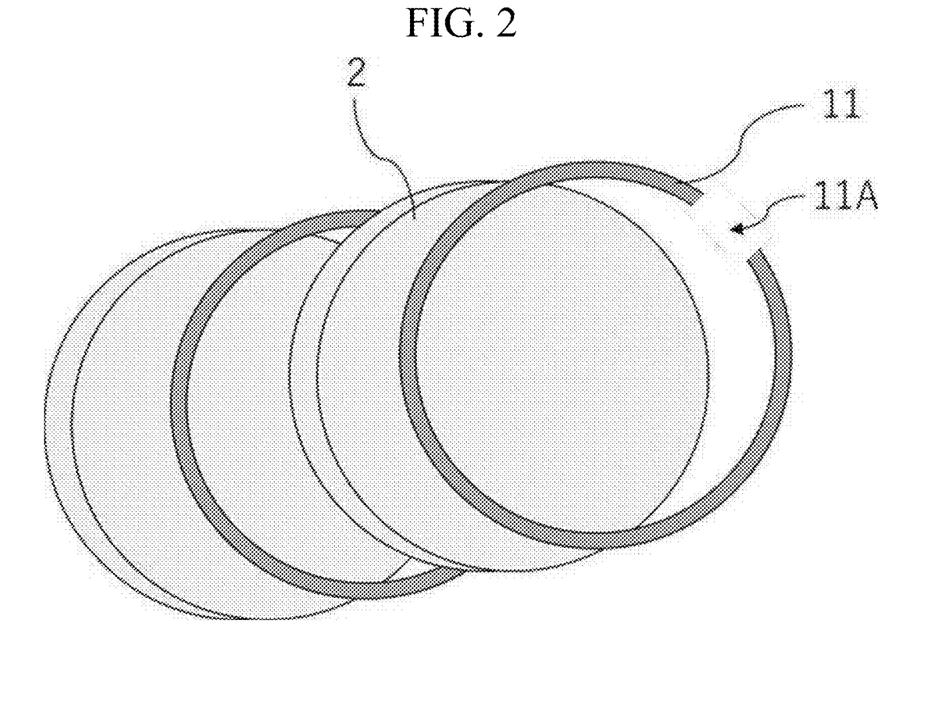
FIG. 2 is a schematic configuration view showing a specific example of frame-shaped members and mold members used in a second embodiment of the present disclosure.

The specific example of the frame-shaped members and the mold members used in the second embodiment of the present disclosure is shown in FIG. 2. As shown in FIG. 2, in the second embodiment, the frame-shaped members 11 with a circular frame shape that are provided with the aperture 11A, and the mold members 2 whose main surfaces are a circular shape are used. In the present embodiment, the above-mentioned first step may be performed by filling the inside of the mold that is configured by disposing the frame-shaped member 11 between two mold members 2 facing each other, with the thermally polymerizable composition from the aperture 11A.

Figure 3:
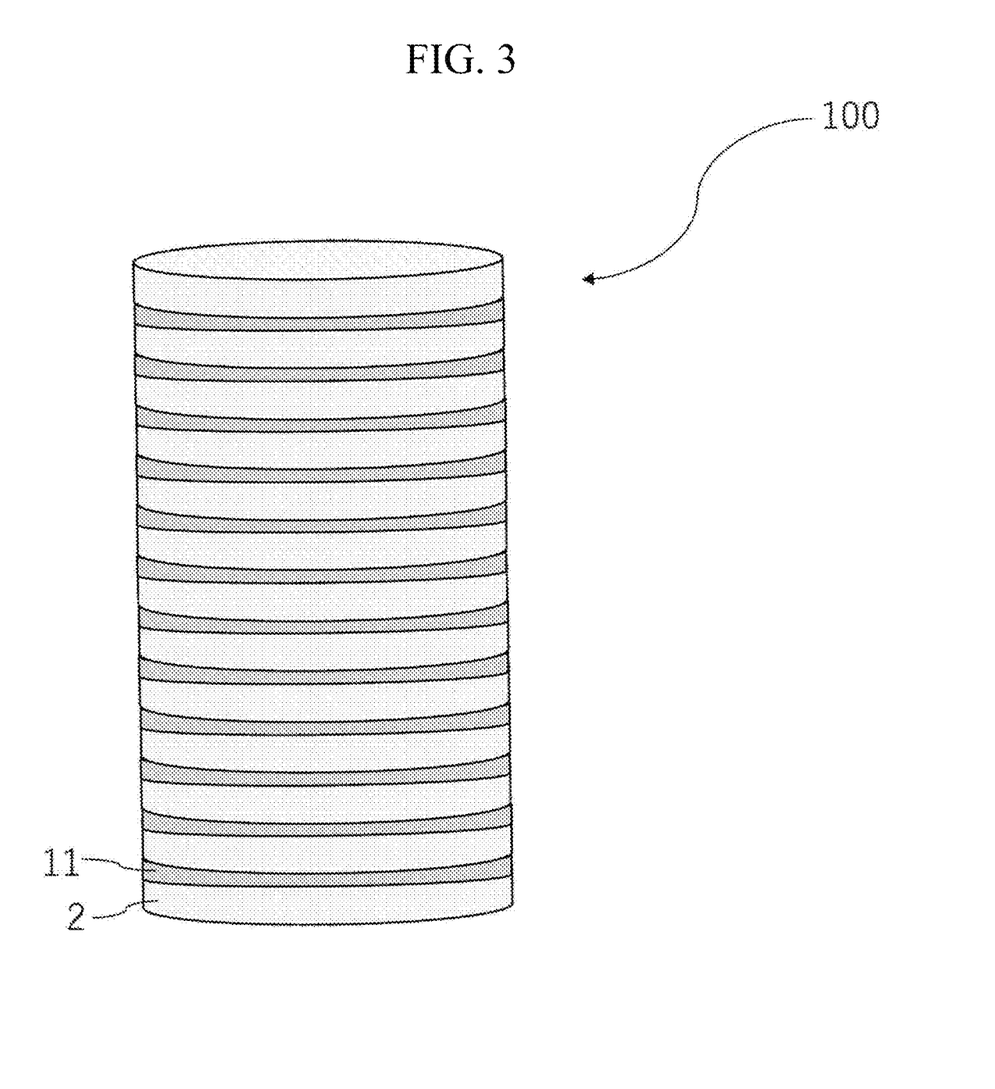
FIG. 3 is a schematic view showing a mold layered body used in the second embodiment of the present disclosure.

In the present embodiment, As shown in FIG. 3, the mold layered body 100 may be configured by stacking the mold members 2 and the frame-shaped members 11 repeatedly. In the layered body 100, each frame-shaped member 11 is provided with the aperture 11A. Thereby, it is possible to fill each frame-shaped member 11 with the thermally polymerizable composition from the aperture 11A after forming the mold layered body 100.

Figure 4:
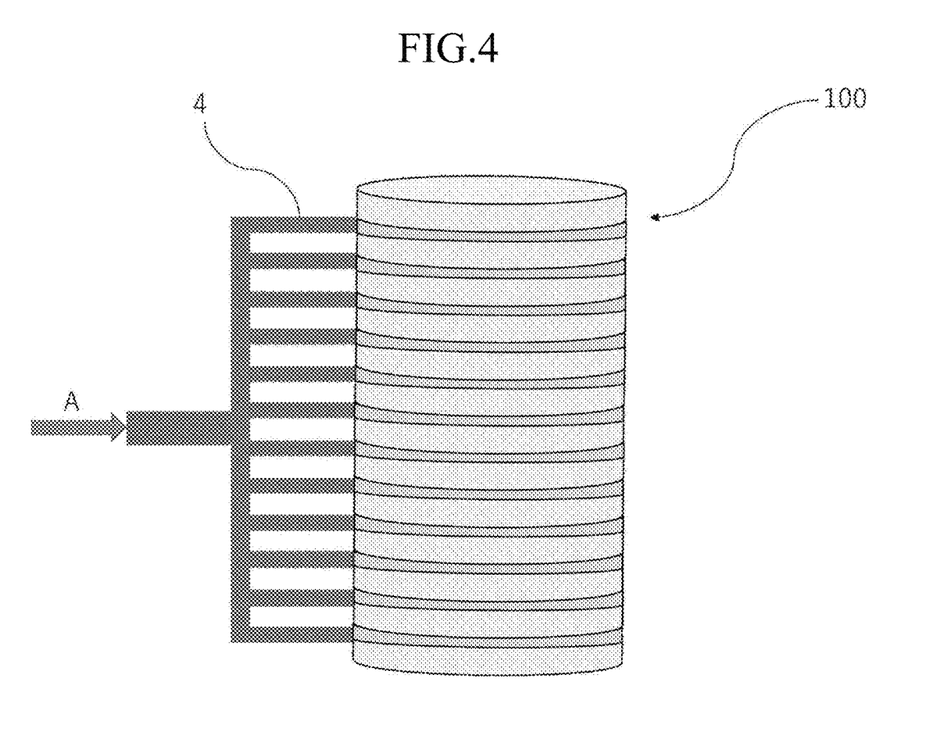
FIG. 4 is a schematic view showing filling a thermally polymerizable composition inside each frame-shaped member of a mold layered body in a second embodiment of the present disclosure.

For example, as shown in FIG. 4, the aperture 11A of each frame-shaped member 11 and a composition supply section 4 may be connected, and as shown by the arrow A, the composition supply section 4 may be supplied with the thermally polymerizable composition. Thereby, it is possible to fill the inside of each frame-shaped member 11 via the composition supply section 4 with the thermally polymerizable composition. When filling the inside of each frame-shaped member 11 via the composition supply section 4 with the thermally coupled composition, the mold layered body 100 may be disposed such that the main surface of each mold member 2 is substantially orthogonal to a vertical direction, and the inside of each frame-shaped member 11 may be filled with the thermally polymerizable composition via the composition supply section 4 from a horizontal direction, or the mold layered body 100 may be disposed such that the main surface of each mold member 2 is substantially parallel to a vertical direction, and the inside of each frame-shaped member 11 may be filled with the thermally polymerizable composition via the composition supply section 4 from the vertical direction.

In the mold layered body 100, the tape-shaped member may be wrapped around the outer peripheral portions of the frame-shaped members 11 and the mold members 2 from the point of inhibiting a leak of the thermally polymerizable composition inside the mold. For example, after wrapping the tape-shaped member around the outer peripheral portions of the frame-shaped members 11 and the mold members 2, the aperture 11A of each frame-shaped member 11 and the composition supply section 4 may be connected, and the inside of each frame-shaped member 11 may be filled with the thermally polymerizable composition via the composition supply section 4. In this case, in order to supply the thermally polymerizable composition inside the mold, the tape-shaped member, wrapped around the outer peripheral portions of the frame-shaped members 11 and the mold members 2, may have apertures facing the apertures 11A. For example, the tape-shaped member in which the apertures are provided with in advance may be used, or, after wrapping the tape-shaped member, the apertures may be formed.

Figure 5:
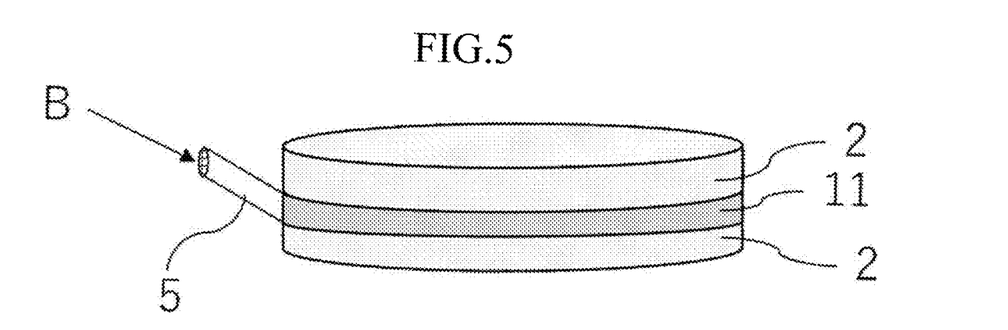
FIG. 5 is a schematic view showing filling a thermally polymerizable composition inside a mold via an aperture member in a modification example of the second embodiment of the present disclosure.

In a modification example of the present embodiment, the mold may be provided with an aperture member 5 connecting with the aperture 11A at the outer peripheral side of the frame-shaped member 11 and sloping toward the vertical upper side. The thermally polymerizable composition is filled inside the mold via the aperture member 5, and thereby the thermally polymerizable composition can be suitably filled inside the mold.

Third Embodiment

Figure 6:
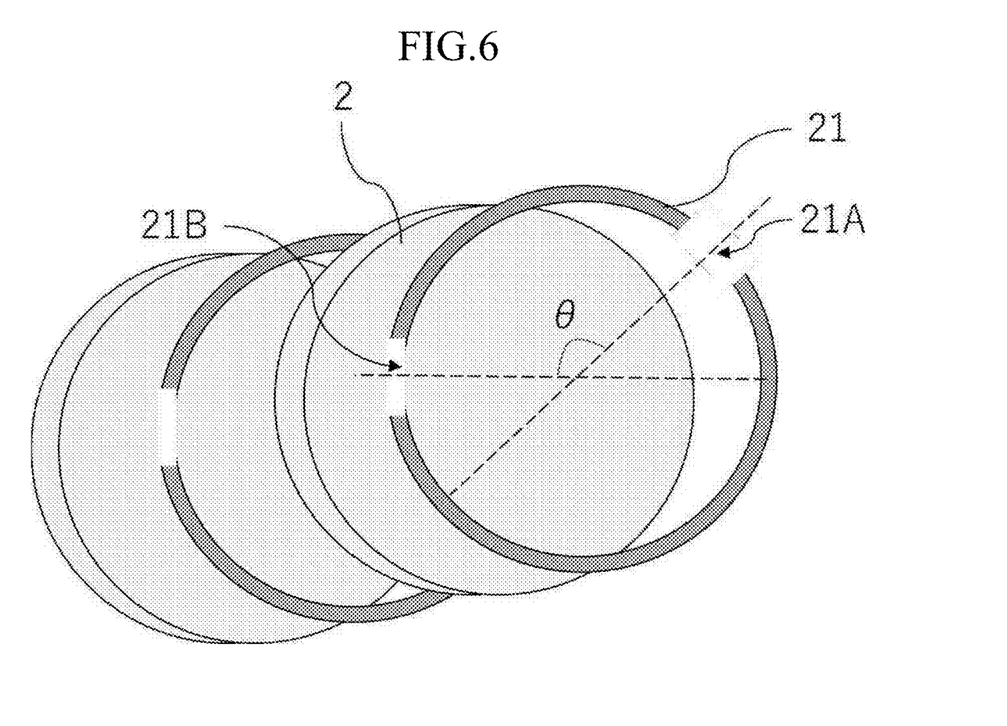
FIG. 6 is a schematic configuration view showing a specific example of frame-shaped members and mold members used in a third embodiment of the present disclosure.

The specific example of the frame-shaped members and the mold members used in the third embodiment of the present disclosure is shown in FIG. 6. As shown in FIG. 6, in the third embodiment, the frame-shaped members 21 with a circular frame shape that are provided with the aperture 21A and 21B, and the mold members 2 whose main surfaces are a circular shape are used. Each frame portion of the frame-shaped members 21 is positioned on virtual straight lines (dotted lines in FIG. 6) extending from the outside of the apertures 21A, and 21B to the inside of each frame-shaped member 21 via the apertures 21A and 21B. Thereby, for example, when the inside of the mold is filled with the thermally polymerizable composition from the aperture 21A, it is possible to inhibit the leak of the thermally polymerizable composition from the aperture 21B, and to suitably release the gas inside the mold from the aperture 21B. From the point of aligning the mold member with a plurality of apertures, the mold member may have an alignment mark, or the mold member may have a groove for alignment or the like.

In the present disclosure, the angle θ between the virtual straight line extending from the outside of the aperture 21A to the inside of the frame-shaped member 21 via the aperture 21A, and the virtual straight line extending from the outside of the aperture 21B to the inside of the frame-shaped member 21 via the aperture 21B is less than 180°.

(Optical Member)

A optical member, obtained by the method of manufacturing the optical member of the present disclosure, includes at least one layer including a cured product of the thermally polymerizable composition. The optical member is excellent in parallelism of main surfaces. For the optical members described below, each configuration may be combined as appropriate.

An example of the optical member is formed by curing the thermally polymerizable composition by heating, the optical member includes a surface A having an area of 1 mm$^2$ or more, and a surface B located on an opposite side from the surface A, and having an area of 1 mm$^2$ or more, in the surface A and the surface B, when a flatness of a region having an area of 1 mm$^2$ is measured by a non-contact type optical flatness meter, the flatness of the surface A and the flatness of the surface B is 50 μm or less, and the optical member contains the mold release agent.

The region to be measured by the non-contact type optical flatness meter may be a region having an area of 1 mm$^2$ whose center is the center of gravity of the main surface.

The flatness of the surface A and the flatness of the surface B are each independently 50 μm or less, from the point of the transmission of optical information, preferably 30 μm or less, and more preferably 20 μm or less.

Examples of the mold release agent that can be contained in the optical member include the above-mentioned internal mold release agent, external mold release agent and the like. The external mold release agent may be one that has been transferred from the contact surface with the thermally polymerizable composition of the mold member to the thermally polymerizable composition when manufacturing the optical member.

Whether or not the release agent is contained in the optical member may be judged by measuring, for example, the element distribution in the depth direction from the surface of the optical member by a secondary ion mass spectrometry method, and for example, determining the concentration of the phosphorus element derived from the internal mold release agent, the fluorine element derived from the external mold release agent, or the like. In a case in which the optical member contains the mold release agent, the concentration of the element derived from the mold release agent in the optical member tends to be higher in the surface region than in the internal region of the optical member.

Another example of the optical member is formed by curing the thermally polymerizable composition by heating, the optical member includes a surface A having an area of 1 mm² or more, and a surface B located on an opposite side from the surface A, and having an area of 1 mm² or more, and, in the surface A and the surface B, when a flatness of a region having an area of 1 mm² is measured by a non-contact type optical flatness meter, an absolute value (parallelism of main surfaces) of a difference between the flatness of the surface A and the flatness of the surface B is 10 μm or less, and the optical member contains the mold release agent.

In the optical member of another example, parallelism of the main surfaces is 10 μm or less, from the point of transmitting optical information with high accuracy, preferably 5 μm or less, and more preferably 1 μm or less. The lower limit of parallelism is not particularly limited as long as the value is 0 μm or more, and may be 0.1 μm or more, or may be 0.5 μm or more.

The shape of the optical member is not particularly limited, and may be a plate shape, a columnar shape, a rectangular parallelepiped shape, or the like.

The refractive index of the optical member is preferably 1.58 or more. The refractive index of the optical member may be 1.80 or less, or may be 1.75 or less. The refractive index of the optical member may be measured in accordance with JIS K7142 (2014).

In the optical member, the surface A and the surface B that are the main surface may not have a grinding mark. By the method of manufacturing the optical member of the present disclosure, the optical member whose main surfaces do not have a grinding mark can be obtained.

Whether there is any grinding mark, for example, when a region having an area of 4,200 μm² is imaged with the non-contact type optical surface roughness tester, it may be confirmed whether or not a plurality of linear portions having a height of 50 nm or less are observed in the image of the main surface.

In the optical member, the cured product of the thermally polymerizable composition contains an organic polymer that is a polymer of the above-mentioned thermally polymerizable composition. The organic polymer includes at least one selected from the group consisting of a poly(thio)urethane resin, an episulfide resin, a polycarbonate resin, a polyester resin, a polyamide resin, a polyimide resin, a poly(meth)acrylate resin, a polyolefin resin, a poly(urea-urethane) resin, a polysulfide resin, and an allyldiglycidyl carbonate resin. Among them, the organic polymer is preferably the poly(thio)urethane resin and the episulfide resin from the point of the refractive index.

The poly(thio)urethane resin is preferably a thiourethane resin, more specifically, more preferably a thiourethane resin obtained by polymerizing the diisocyanate compound and the polythiol compound.

The optical member with a coating layer may be obtained by forming the coating layer on at least one main surface of the optical member. Examples of the coating layer include a primer layer, a hard coat layer, an antireflection layer, an anti-fogging coat layer, an anti-contamination layer, and a water repellent layer. Each of these coating layers can be used alone, or a plurality of coating layers can be used in a multi-layered manner.

In a case in which the coating layers are applied to both main surfaces of the optical member, the same coating layer may be applied to each main surface, or different coating layers may be applied to each main surface.

The use of the optical member of the present disclosure is not particularly limited, and can be used, for example, in eyeglasses, display devices, image pickup devices, optical devices, and the like. The optical member can be used for a wearable device, and more specifically, it can be used for wearable displays that realizes virtual reality (VR: Virtual Reality), augmented reality (AR: Augmented Reality), and the like.

<Apparatus for Transmitting Optical Information>

An apparatus for transmitting optical information of the present disclosure include: a light irradiation section; and a light guide including a plurality of the above-mentioned optical members, wherein the plurality of the optical members are disposed such that main surfaces of the optical members are substantially parallel to each other. This apparatus for transmitting optical information is lightweight, and is capable of transmitting optical information with a high accuracy, due to including a plurality of the above-mentioned optical members.

In the apparatus for transmitting optical information of the present disclosure, the above-mentioned optical members of the present disclosure may be directly disposed one on another in layers, or may be disposed one on another in layers with an adhesive layer(s) interposed between the optical members. The adhesive layer may be formed, for example, by applying a composition containing a monomer as a raw material of an organic polymer to one optical member, to form a composition layer, sandwiching the thus formed composition layer between the two optical members, and then irradiating ultraviolet light to the composition layer so as to polymerize the monomer.

Figure 7:
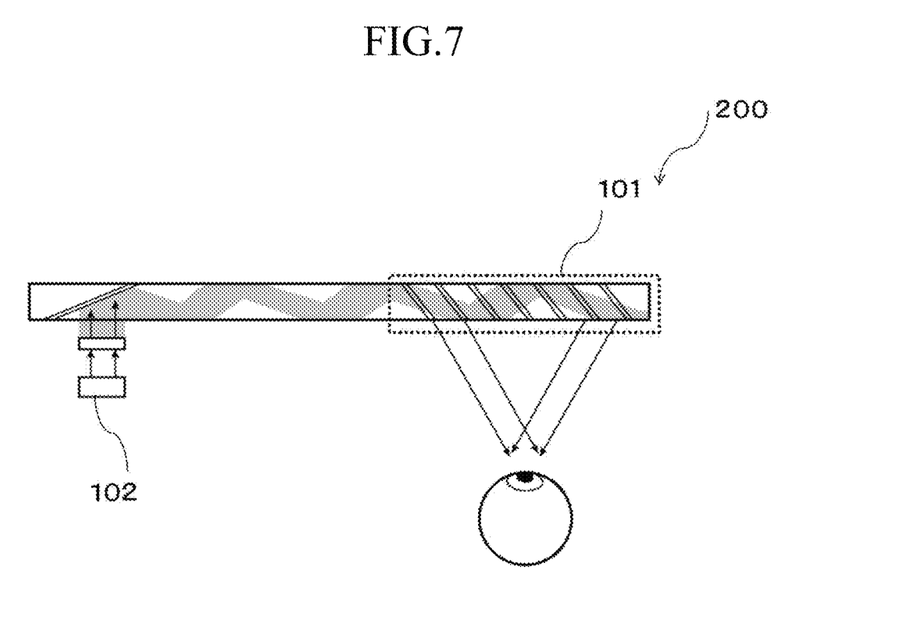
FIG. 7 is a schematic configuration view showing an example of an apparatus for transmitting optical information of the present disclosure.

FIG. 7 shows one example of the apparatus for transmitting optical information of the present disclosure. An apparatus for transmitting optical information 200 includes: an image display section 101; and a light guide in which a plurality of optical members 102 are disposed. The light generated from the image display section 101 is reflected by the optical members 102 in the light guide, and the light reflected and scattered by the plurality of the optical members 102 is irradiated into the eyes of a user wearing the apparatus for transmitting optical information 200, as a result of which an image displayed on the image display section 101 is recognized by the user.

A method of manufacturing the apparatus for transmitting optical information of the present disclosure includes a step of preparing the light irradiation section and a plurality of the optical members obtained by the above-mentioned method of manufacturing the optical member of the present disclosure, a step of disposing a plurality of the optical members such that main surfaces of the optical members are substantially parallel to each other to form the light guide, and is a method to manufacture the apparatus for transmitting optical information including the light irradiation section and the light guide in which the light from the light irradiation section is irradiated.

EXAMPLES

Hereinafter, the present invention will be more specifically described by examples, the present invention is not limited to the following examples.

Examples 1 to 3

Figure 8:
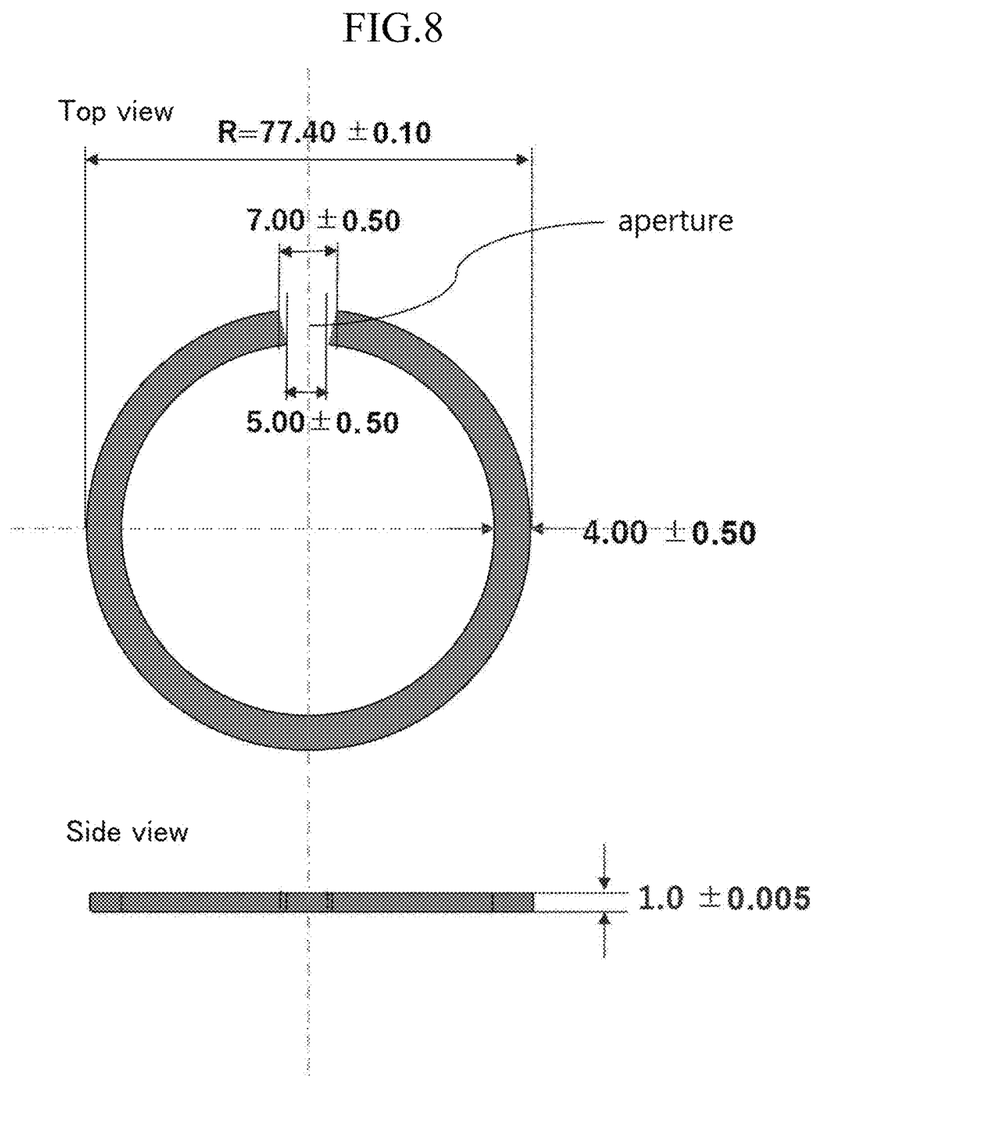
FIG. 8 is a top view of a frame-shaped member used in Examples 1 to 3 and a side view of the frame-shaped member used in Examples 1 to 3.

In each of Examples 1 to 3, the frame-shaped member shown in FIG. 8 was used. The shape of the frame-shaped member is ring-shaped, and the material of the frame-shaped member is SUS304, the Young's modulus of the frame-shaped member is 195 GPa. The unit of the numerical value shown in FIG. 8 is mm, and the ring thickness (unit is mm, arbitrary 6 points) and the variation in thickness (maximum value-minimum value, unit is mm, Δ in Table 1) of Examples 1 to 3 are as shown in Table 1 below.

TABLE 1

| Frame-shaped member | Example 1 | Example 2 | Example 3 |
|---|---|---|---|
| 1 | 0.965 | 0.9664 | 0.9661 |
| 2 | 0.9637 | 0.9672 | 0.9663 |
| 3 | 0.9648 | 0.9649 | 0.9672 |
| 4 | 0.9655 | 0.9625 | 0.9663 |
| 5 | 0.9669 | 0.962 | 0.966 |
| 6 | 0.9665 | 0.965 | 0.9691 |
| Δ | 0.0032 | 0.0052 | 0.0031 |

The mold configured by disposing the frame-shaped member in Examples 1 to 3 between two glass plates facing each other was prepared and the inside of the mold was filled with MR-10 that was the thermally polymerizable composition (thiourethane resin, refractive index 1.67, Mitsui Chemicals, Inc.) via aperture of the frame-shaped member. The mold was heated to the polymerization initiation temperature of 15° C. or higher to cure the thermally polymerizable composition. The glass plates and the frame-shaped member were removed to obtain the optical member.

The thickness of the optical member (arbitrary 6 points) obtained in Examples 1 to 3 and the variation in thickness (maximum value-minimum value, Δ in Table 1) are as shown in Table 2 below.

TABLE 2

| Optical member | Example 1 | Example 2 | Example 3 |
|---|---|---|---|
| 1 | 0.9663 | 0.9703 | 0.9555 |
| 2 | 0.9649 | 0.9681 | 0.9526 |
| 3 | 0.9628 | 0.9665 | 0.9522 |
| 4 | 0.9638 | 0.9668 | 0.9533 |
| 5 | 0.9647 | 0.9664 | 0.9531 |
| 6 | 0.9634 | 0.9667 | 0.9546 |
| Δ | 0.0035 | 0.0039 | 0.0033 |

Comparative Examples 1 and 2

Instead of the frame-shaped member, the adhesive tapes shown below were used in Comparative Example 1 and Comparative Example 2.

Comparative example 1: Silicon tape, product name 6263-73, manufactured by Maxell Sliontec Ltd.

Comparative example 2: Silicon tape, product name TT2S, manufactured by Takara Pac LTD.

In each of Comparative Examples 1 and 2, a pair of glass plates was disposed at predetermined intervals (substantially the same as the thickness of the frame-shaped members in Examples 1 to 3), and each of the above-mentioned tapes is attached to the outer peripheral surfaces of these glass plates along the circumferential direction to seal the space between a pair of the glass plates. Next, the injection nozzle was inserted into the sealed space, and the thermally polymerizable composition used in Examples 1 to 3 was injected and filled into the space via the injection nozzle. Then, the thermally polymerizable composition was cured by heating in the same manner as in Examples 1 to 3. After the thermally polymerizable composition was cured, each of the tapes was peeled off and the glass plates were removed to obtain an optical member.

The thickness of the optical member (unit is mm, arbitrary 6 points) obtained in comparative Examples 1 and 2 and the variation in thickness (maximum value-minimum value, unit is mm, Δ in Table 1) are as shown in Table 3 below.

TABLE 3

| Optical member | Comparative Example 1 | Comparative Example 2 |
|---|---|---|
| 1 | 0.8216 | 0.6519 |
| 2 | 0.8873 | 0.7331 |
| 3 | 0.9116 | 0.8259 |
| 4 | 0.8971 | 0.9464 |
| 5 | 0.887 | 0.9844 |
| 6 | 0.8378 | 0.9127 |
| 7 | 0.8203 | 0.7821 |
| 8 | 0.8189 | 0.6685 |
| Δ | 0.0927 | 0.3325 |

As shown in Table 2 and Table 3, it could be confirmed that the optical members obtained in Examples 1 to 3 had smaller variation in thickness and were more excellent in parallelism of main surfaces than the optical members obtained in Comparative Examples 1 and 2.

The disclosure of Japanese Patent Application 2019-172153, filed on Sep. 20, 2019 is incorporated herein by reference in their entirety.

All publications, patent applications, and technical standards mentioned in the present specification are incorporated herein by reference to the same extent as if each individual publication, patent application, or technical standard was specifically and individually indicated to be incorporated by reference.

The invention claimed is:

1. A method of manufacturing an optical member by curing a thermally polymerizable composition by heating, comprising, in the following order:
    filling an inside of a mold with the thermally polymerizable composition in which the mold is configured by disposing a frame-shaped member, with a Young's modulus of 3.0 GPa or more at a polymerization initiation temperature T (° C.) of the thermally polymerizable composition, between two mold members facing each other; and
    heating the mold to the polymerization initiation temperature T or more.

2. The method of manufacturing an optical member according to claim 1, wherein:
    the frame-shaped member is provided with at least one aperture, and
    in the filling the inside of the mold, the thermally polymerizable composition is filled inside the mold from the aperture.

3. The method of manufacturing an optical member according to claim 2, wherein:
    the frame-shaped member is provided with a plurality of apertures, and
    a frame portion of the frame-shaped member is positioned on virtual straight lines extending from an outside of the apertures to an inside of the frame-shaped member via the apertures.

4. The method of manufacturing an optical member according to claim 2, wherein in the filling the inside of the mold, when the mold is disposed such that main surfaces of the mold member is substantially orthogonal to a vertical direction, the mold is provided with an aperture member connecting with the aperture at an outer peripheral side of the frame-shaped member and sloping toward a vertical upper side, and the thermally polymerizable composition is filled inside the mold via the aperture member.

5. The method of manufacturing an optical member according to claim 1, wherein the mold is a mold layered body configured by stacking the mold members and frame-shaped members repeatedly.

6. The method of manufacturing an optical member according to claim 5, wherein, in the heating the mold, the mold layered body is disposed such that main surfaces of the mold members are substantially orthogonal to a vertical direction and the mold layered body is heated.

7. The method of manufacturing an optical member according to claim 1, wherein an average distance between main surfaces of the two mold members facing each other in the mold is 10 mm or less.

8. The method of manufacturing an optical member according to claim 1, wherein a refractive index of the optical member is 1.58 or more.

9. The method of manufacturing an optical member according to claim 1, wherein the thermally polymerizable composition contains at least one selected from the group consisting of a poly(thi)ol compound, a polyiso(thio)cyanate compound and an episulfide compound.

10. The method of manufacturing an optical member according to claim 3, wherein in the filling the inside of the mold, when the mold is disposed such that main surfaces of the mold member is substantially orthogonal to a vertical direction, the mold is provided with an aperture member connecting with the aperture at an outer peripheral side of the frame-shaped member and sloping toward a vertical upper side, and the thermally polymerizable composition is filled inside the mold via the aperture member.

11. The method of manufacturing an optical member according to claim 2, wherein the mold is a mold layered body configured by stacking the mold members and frame-shaped members repeatedly.

12. The method of manufacturing an optical member according to claim 3, wherein the mold is a mold layered body configured by stacking the mold members and frame-shaped members repeatedly.

13. The method of manufacturing an optical member according to claim 4, wherein the mold is a mold layered body configured by stacking the mold members and frame-shaped members repeatedly.

14. The method of manufacturing an optical member according to claim 10, wherein the mold is a mold layered body configured by stacking the mold members and frame-shaped members repeatedly.

15. The method of manufacturing an optical member according to claim 11, wherein, in the heating the mold, the mold layered body is disposed such that main surfaces of the mold members are substantially orthogonal to a vertical direction and the mold layered body is heated.

16. The method of manufacturing an optical member according to claim 12, wherein, in the heating the mold, the mold layered body is disposed such that main surfaces of the mold members are substantially orthogonal to a vertical direction and the mold layered body is heated.

* * * * *